Nov. 18, 1958   E. P. WIGNER ET AL   2,861,034
NEUTRONIC REACTOR SHIELD AND SPACER CONSTRUCTION
Filed Sept. 18, 1945   4 Sheets-Sheet 1

Witnesses:
Herbert E. Metcalf
Estill E. Ezell

Inventors:
Leo A. Ohlinger
Eugene P. Wigner
By
Attorney

Nov. 18, 1958     E. P. WIGNER ET AL     2,861,034
NEUTRONIC REACTOR SHIELD AND SPACER CONSTRUCTION
Filed Sept. 18, 1945     4 Sheets-Sheet 2
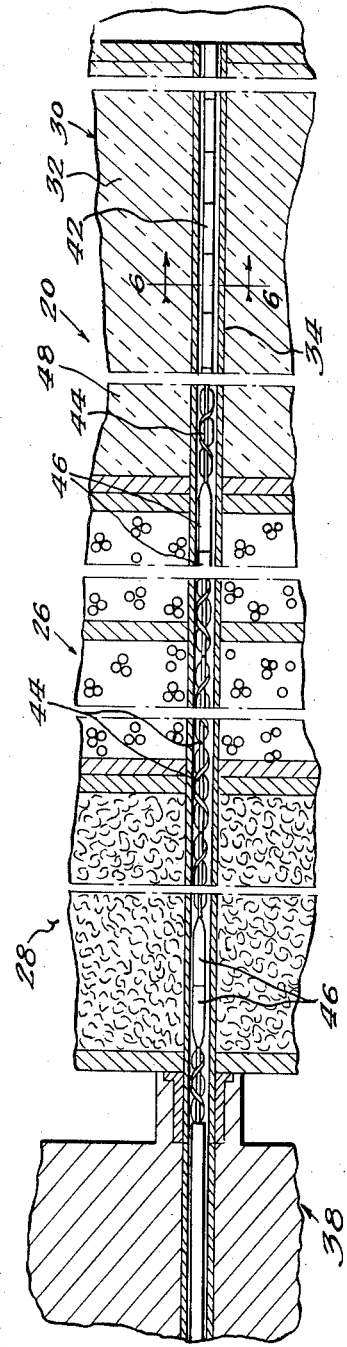
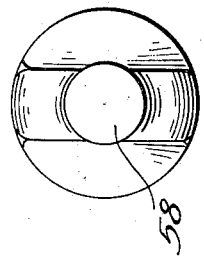
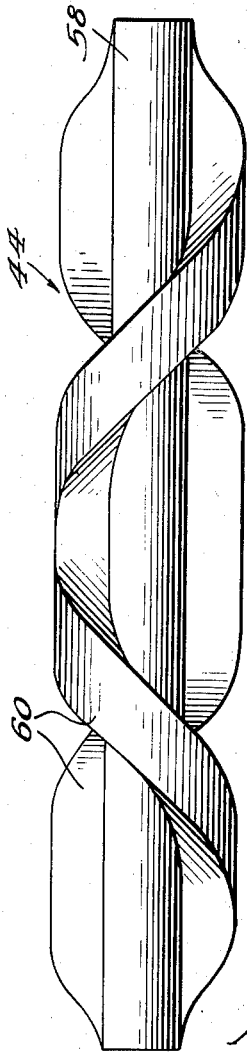

Nov. 18, 1958   E. P. WIGNER ET AL   2,861,034
NEUTRONIC REACTOR SHIELD AND SPACER CONSTRUCTION
Filed Sept. 18, 1945   4 Sheets-Sheet 4

FIG. 9

INVENTORS
LEO A. OHLINGER
EUGENE P. WIGNER
BY
ATTORNEY

United States Patent Office 2,861,034
Patented Nov. 18, 1958

2,861,034

NEUTRONIC REACTOR SHIELD AND SPACER CONSTRUCTION

Eugene P. Wigner and Leo A. Ohlinger, Chicago, Ill., assignors to the United States of America as represented by the United States Atomic Energy Commission Application September 18, 1945, Serial No. 617,123

1 Claim. (Cl. 204—193.2)

This invention relates generally to neutronic reactors, and more particularly to devices employed in conjunction with cooling of neutronic reactors.

In neutronic reactors, a neutron fissionable isotope, such as $U^{233}$, $U^{235}$, $94^{239}$ or mixtures thereof, is subjected to fission by absorption of neutrons, and a self-sustaining chain reaction is established by the neutrons evolved by the fission. In general, such reactors comprise bodies of compositions containing such fissionable material, for example, natural uranium, disposed in a neutron slowing material which slows the neutrons to thermal energies. Such a slowing material is termed a neutron moderator. Carbon and $D_2O$ (heavy water) are typical moderators suitable for such use. Heat is evolved during the reaction which is removed by passage of a coolant through the reactor in heat exchange relationship therewith. Specific details of the theory and essential characteristics of such reactors are set forth in Fermi et al. Patent 2,708,656, issued May 17, 1955, and the copending Creutz et al. application, Serial Number 574,153, filed January 23, 1945.

As is stated above, in the operation of a neutronic reactor heat is evolved during the reaction which is removed by passage of a coolant through the reactor in heat exchange relationship with the active materials. In reactors of the type such as that disclosed in Figs. 5 through 7 of the latter application referred to above, the fissionable material is loaded into channels opening into one face of the reactor and a coolant, such as water, is introduced into the channels from the same face. It is manifest that suitable shielding units or plugs will be required in the channels between the outermost bodies of fissionable material and the face of the reactor into which the channels open, since operating personnel must be shielded from the harmful emanations of the reactive portion of the reactor. The plugs heretofore used have proved unsatisfactory, particularly due to causing a serious drop in the pressure of the passing coolant. The present invention overcomes existing difficulties in the provision of novel spacing plugs disposed between improved shielding plugs.

Therefore, it is an object of the present invention to provide a novel spacing plug which is adapted to be used in the coolant channel of a neutronic reactor.

Another object is to provide a novel shielding and spacing construction for the coolant channel of a neutronic reactor.

Another object is to provide a novel spacing device adapted for use in the coolant channel of a neutronic reactor which is constructed to effect a minimum pressure drop in a passing coolant and which remains substantially stationary in the coolant channel during passage of coolant.

The foregoing and other objects and advantages are apparent from the following description read with reference to the accompanying drawings, in which:

Fig. 2 is an enlarged fragmentary longitudinal cross-sectional view, partly in elevation, of one coolant channel of the reactor of Fig. 1 showing spacing and shielding elements or plugs disposed and constructed in accordance with the teachings of the present invention;

Fig. 4 is an enlarged elevational view of the spacing plug shown in Fig. 2;

Fig. 5 is an end view of the spacing plug shown in Fig. 4;

Fig. 9 is a schematic diagram showing the external circulating system for the coolant of the reactor.

Figure 1:
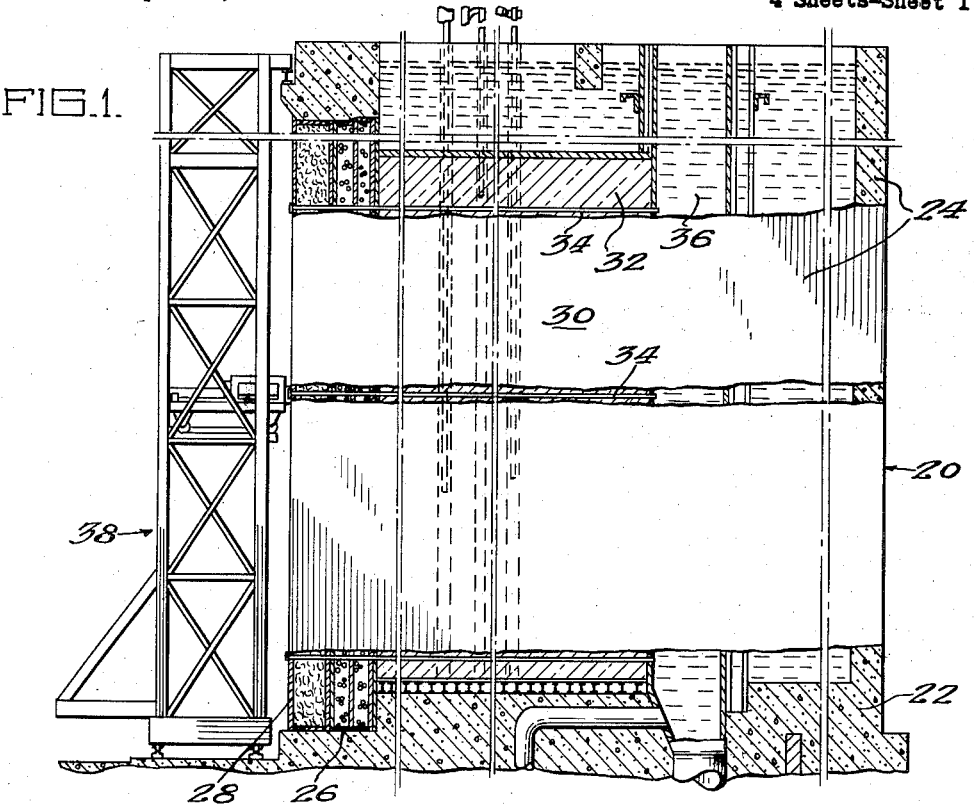
Fig. 1 is a diagrammatic fragmentary vertical cross-sectional view, partly in elevation, through the reactive portion and the loading structure of a neutronic reactor.

Referring to the drawings, there is shown diagrammatically in Fig. 1 a neutronic reactor 20 of the type with which the present invention finds particular application and which is described in detail in the above-mentioned copending applications. Broadly, the neutronic reactor 20 includes a supporting base 22 of concrete, a vertical concrete wall 24 extending from the foundation 22 and forming three sides of a large enclosure, and a steel shot and water shield 26 forming the fourth side of the enclosure. Exteriorly of and adjacent to the shield 26 is a shield 28 comprising steel chamber-defining plates enclosing lead wool or shot. Within the enclosure just described is a reactive portion 30 which comprises graphite moderator material 32 within which is disposed a plurality of tubes or channels 34 which extend through the shields 26 and 28 in one direction and open into a chamber containing coolant water 36 at the other ends. A charging or loading structure 38 is disposed adjacent the shield 28. If the reactor is located near a relatively pure body of water, such as a river of sufficient size to supply the necessary quantity of water to extract the required amount of heat, then this river water can be passed through the reactor after first being processed to obtain the required purity. Under these conditions the water after passing through the reactor is returned to the river.

In the event a natural body of water is not available, then a supply of coolant must be provided. In this event, it is desirable to recirculate the coolant through the reactor many times, and thus reduce to a minimum the total quantity required. The coolant leaving the reactor may carry with it certain free gases, such as hydrogen and oxygen, if water is used, which should be eliminated from the cooling circuit. For this purpose, the coolant leaving the reactor is passed through a flash tank where these gases are removed. The coolant is then cooled, and finally pumped back through the reactor and recirculated.

In Fig. 9, the reactor is diagrammatically shown at 20, the water inlet header being illustrated 140. The cooling water is discharged from the reactor into the vertical chute 128, and then enters the pipe 141 through which it is conveyed by pump 141b to a flash tank 142, after passing through a throttling valve 141a. The water leaves the flash tank 142 through pipe 143, passes through heat exchanger 144 where it is cooled by flowing in heat exchange relationship with a cooler liquid, and then flows through pipe 145 and is returned to the reactor 20 by the pump 146 through pipe 147.

The water entering the heat exchanger 144 has a temperature only slightly less than the boiling point at the existing pressure. The water leaving the heat exchanger 144 has a temperature of about 95° F., this cooling being accomplished by transferring the heat to the cooler fluid in a secondary cooling system.

This secondary cooling system includes a cooling tower generally illustrated at 154, a pump 155, the heat exchanger 144 and suitable piping 156. The cooling fluid in the cooling tower 154, and for purposes of illustration water has been selected for this fluid, is collected in a reservoir 157 at the bottom of the tower from which the water is withdrawn by pump 155 and passed to the heat exchanger 144. This water entering the heat exchanger 144 is at a temperature of about 85° F. and leaves the heat exchanger at a temperature of about 130° F. This hot water passes through pipes 156 into spray head 158 disposed adjacent to the top of the cooling tower 154. The hot water is sprayed in a fine mist into the cooling tower 154, and mixes with air circulated through the cooling tower by a blower 159. Evaporation takes place resulting in the cooling of the water in the cooling tower 154 so that the water collected in the reservoir 157 has been effectively cooled by this process of evaporation. Losses due to vaporization may be replaced as will be understood in the art. Louvered openings 160 are provided in a wall of the cooling tower 154 through which air is discharged.

A portion of the cold water leaving the pump 155 is by-passed from the secondary cooling system through a pipe 162 feeding condenser coils 152 and is returned to the secondary cooling system through pipe 163.

The entire primary water circulating system is provided with radiation shielding to protect personnel from the harmful effects of gamma radiations. As shown, the flash tank 142 is surrounded by a cylindrical concrete wall 164 extending above the top of the flash tank 142 and forming an enclosure which is completely filled with water. A similar wall 165 surrounds the heat exchanger 144, and the tank formed thereby likewise is filled with water. For purposes of illustration, only a diagrammatic showing is made at 166 of a shield surrounding the reactor 20. More complete details of this latter shield are brought out in the description of the reactor itself. For further details of the reactor 20 the disclosures of the above-identified copending applications are hereby incorporated by reference.

Figure 6:
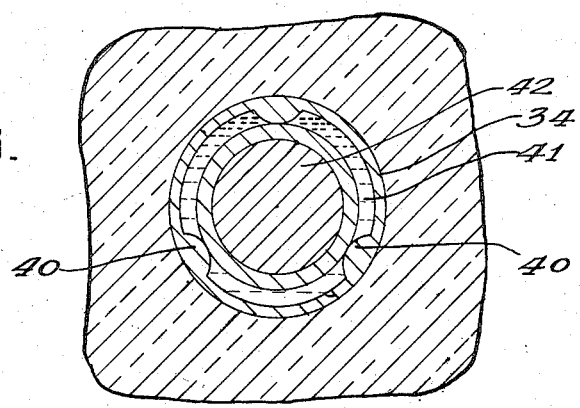
Fig. 6 is an enlarged cross-sectional view taken on the line 6—6 of Fig. 2.

Referring to Figs. 2 and 6, one channel 34 is disclosed on an enlarged scale. The channel 34 includes longitudinal ribs 40 which support abutting bodies 42 of fissionable material in the reactive portion 30, and spacing plugs 44 and shielding plugs 46 in the reflector portion 48 of the reactive portion 30 and in the shields 26 and 28, as shown. The abutting bodies 42 are disposed within the channels 34 in the graphite moderator except in those portions of the channels in the moderator that are adjacent that part of the shield 26 through which the channels 34 extend. The spacing plugs 44 are in those portions of the channels 34 and also in certain portions of the channels 34 that extend through the shield 26. The section of the graphite moderator that contains the aforementioned channel portions which are beyond the bodies 42 is the reflector portion 48. The ribs 40 in each channel 34 constitute means inside each channel for spacing the shielding elements 46 therein from the inside of the channel. A coolant 41, such as water, flows between the bodies 42 and the interior of the channel 34.

Figure 3:
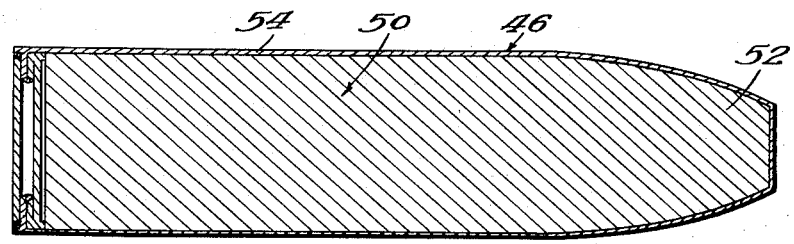
Fig. 3 is an enlarged longitudinal cross-sectional view of the shielding plug shown in Fig. 2.

In Fig. 3 the shielding plug 46 is shown in detail and includes a cylindrical body 50 of lead or steel, or other gamma ray and neutron absorbing material, having a reduced blunt nose portion 52 to ease the coolant flow. Thus the body 50 is constructed of material having high neutron and radiation absorption cross sections. The body 50 is disposed in an aluminum sheath 54 which is suitably sealed at the end remote from the nose portion 52, the disclosed seal comprising a double weld. The ends of the shielding plug 46 form planes at substantially right angles to the longitudinal axis of the body 50 to insure firm abutting relationship with adjacent plugs when disposed in the channel 34.

In Figs. 4 and 5 a preferred embodiment of the spacing plug 44 is shown in detail. The plug 44 includes a strong solid central rod 58 to which is secured two spiral ribs or fins 60, which wind in opposite directions about the rod. The plug 44 may be cast as an integral unit or the ribs 60 may be secured in any suitable manner to the rod 58. Aluminum is a preferred material for the plug 44.

Figure 7:
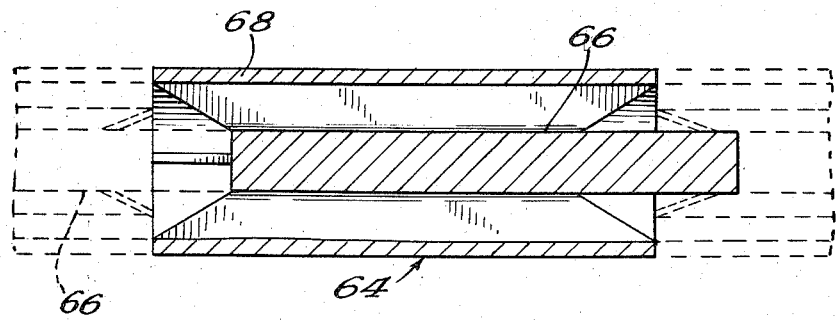
Fig. 7 is a longitudinal cross-sectional view through a modified spacing plug.
Figure 8:
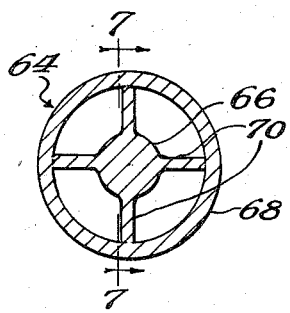
Fig. 8 is a cross-sectional view taken on the line 8—8 of Fig. 7.

In Figs. 7 and 8 there is disclosed a modified spacing plug generally designated 64. The spacing plug 64 includes a central solid rod 66 and a cylindrical portion 68 secured to the rod 66 by four substantially equally spaced ribs or fins 70. The rod 66 is offset longitudinally with respect to the cylindrical portion 68 and the ribs 70 are undercut at both ends in respect to the cylindrical portion 68, as is clearly shown in Fig. 7. When the plug 64 is disposed in a channel 34 it is not essential that the ribs 70 align, although suitable notching means, or the like, may be provided to effect alignment if desired.

As is shown in Fig. 2, one preferred disposition of shielding plugs 46 and spacing plugs 44 in respect to the type of neutronic reactor 20 disclosed herein contemplates a pair of shielding plugs 46 disposed within the shield 26 adjacent the reactor portion 30 to absorb a substantial portion of the primary gamma rays following the channel 34 as an exit path, and a second pair of shielding plugs 46 disposed in the shield 28 adjacent the charging side thereof to absorb secondary gamma rays. Between the pairs of shielding plugs 46, between the inner pair of shielding plugs 46 and the fissionable bodies 42, and outwardly of the outer pair of shielding plugs 46 are disposed spacing plugs 44. The spacing plugs 44 and the shielding plugs 46 are supported by the ribs 40.

A coolant medium such as water is introduced into the channels 34 adjacent the charging ends and passes between the shielding plugs 46 and the inner surfaces of the channels 34 and through the passageways provided by the reverse spirals of the spacing plugs 44. Inasmuch as there is no great restriction of the coolant flow through the spacing plugs 44 the pressure drop of the coolant in passing the spacing plugs 44 is very small, an important advantage since the maximum amount of pressure which can be applied to the coolant for forcing it through the reactive portion 30 is limited by a number of factors which are set forth in the above-identified copending applications. Furthermore, the oppositely directed ribs 60 on each of the plugs 44 prevent the rushing coolant from rotating the plugs in the channels 34, an action which would damage either the plugs 44 or the channels 34, or both, and which would give an undesirable swirling action to the coolant.

The same advantages obtain for the spacing plug 64 as for the spacing plug 44. It is to be understood that the plugs 64 are disposed in coolant channels in the same manner as plugs 44 when operatively employed. Both plugs have sufficient structural strength to permit their use as cumulative ram rods in charging the coolant channels with fissionable material if such is desired.

While the theory of nuclear reactions set forth herein is based on the best presently known experimental evidence, the invention is not limited thereto, as additional experimental data later discovered may modify the theory disclosed.

Obviously, many modifications may be made in the specific plug embodiments and in the disposition of the shielding and spacing plugs disclosed without departing from the intended scope of the invention.

What is claimed is:

A neutronic reactor comprising a graphite moderator provided with a plurality of channels therethrough, a shield disposed about the moderator, the channels extending through the shield, a plurality of abutting bodies of uranium disposed within the channels in the graphite moderator except in those portions of the channels in the moderator that are adjacent that part of the shield through which the channels extend, a plurality of spacer elements disposed within said outer portions of the channels in the graphite moderator, each spacing element comprising a solid rod member and a pair of ribs winding about said member in opposite directions, shielding elements constructed of material having high neutron and radiation absorption cross sections disposed within the channels traversing the shields within the reactor, means inside each channel for spacing the shielding elements therein from the inside of the channel, and means to flow fluid coolant through the channels.

References Cited in the file of this patent

UNITED STATES PATENTS

| | | |
|---|---|---|
| 52,691 | Davis | Feb. 20, 1866 |
| 799,600 | Hendrich | Sept. 12, 1905 |
| 865,125 | Roberts et al. | Sept. 3, 1907 |
| 884,315 | Carroll | Apr. 7, 1908 |
| 928,301 | Andrews | July 20, 1909 |
| 1,201,379 | Steynis | Oct. 17, 1916 |
| 1,230,256 | Willson et al. | June 19, 1917 |
| 1,332,019 | Allison | Feb. 24, 1920 |
| 1,453,284 | Robe | May 1, 1923 |
| 1,502,581 | Mueller | July 22, 1924 |
| 1,921,555 | Welsh | Aug. 8, 1933 |

FOREIGN PATENTS

| | | |
|---|---|---|
| 233,011 | Switzerland | Oct. 2, 1944 |